United States Patent [19]

Gorski

[11] Patent Number: 4,861,098
[45] Date of Patent: Aug. 29, 1989

[54] VEHICLE STRUCTURE INCLUDING A BRACKET STRUCTURE ASSEMBLY FOR MOUNTING A LOOSE UPPER DECK PANEL ONTO A VEHICLE BODY

[75] Inventor: William J. Gorski, Warren, Mich.

[73] Assignee: Chrysler Motors Corporation, Highland Park, Mich.

[21] Appl. No.: 191,939

[22] Filed: May 9, 1988

[51] Int. Cl.4 .................. B62D 25/08; B62D 27/00
[52] U.S. Cl. ................... 296/195; 296/187; 296/191; 296/29; 29/418
[58] Field of Search ............... 296/187, 191, 192-195, 296/197, 29; 29/418

[56] References Cited

U.S. PATENT DOCUMENTS 4,466,654 8/1984 Abe .................................. 296/194 X
4,521,050 6/1985 Rea et al. ........................ 296/194 X

FOREIGN PATENT DOCUMENTS 134325 8/1982 Japan .................................. 296/187
0018574 1/1986 Japan .................................. 296/192

Primary Examiner—Dennis H. Pedder
Attorney, Agent, or Firm—Edward A. Craig

[57] ABSTRACT

A bracket structure assembly is provided for mounting a loose upper deck panel onto a vehicle body in the space between the rear vehicle window and the vehicle deck lid. The bracket structure includes a spacer element for positioning the bracket structure both vertically and longitudinally with respect to the deck lid. Securement means are provided on the bracket structure for mounting of the loose upper deck panel thereon in proper position with respect to the deck lid.

6 Claims, 2 Drawing Sheets

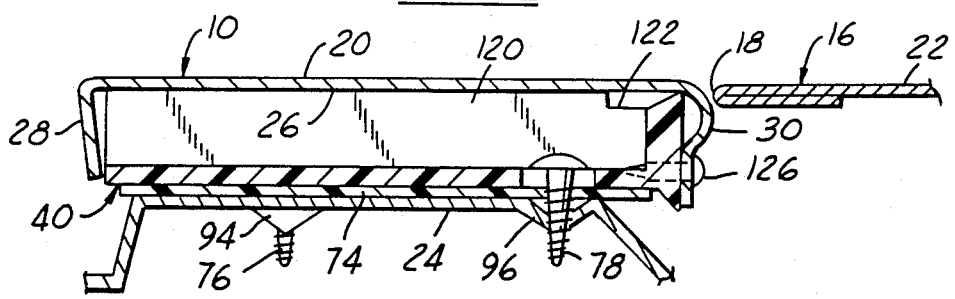
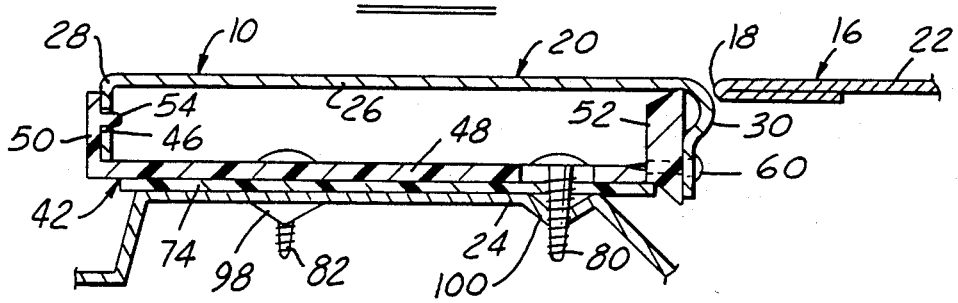
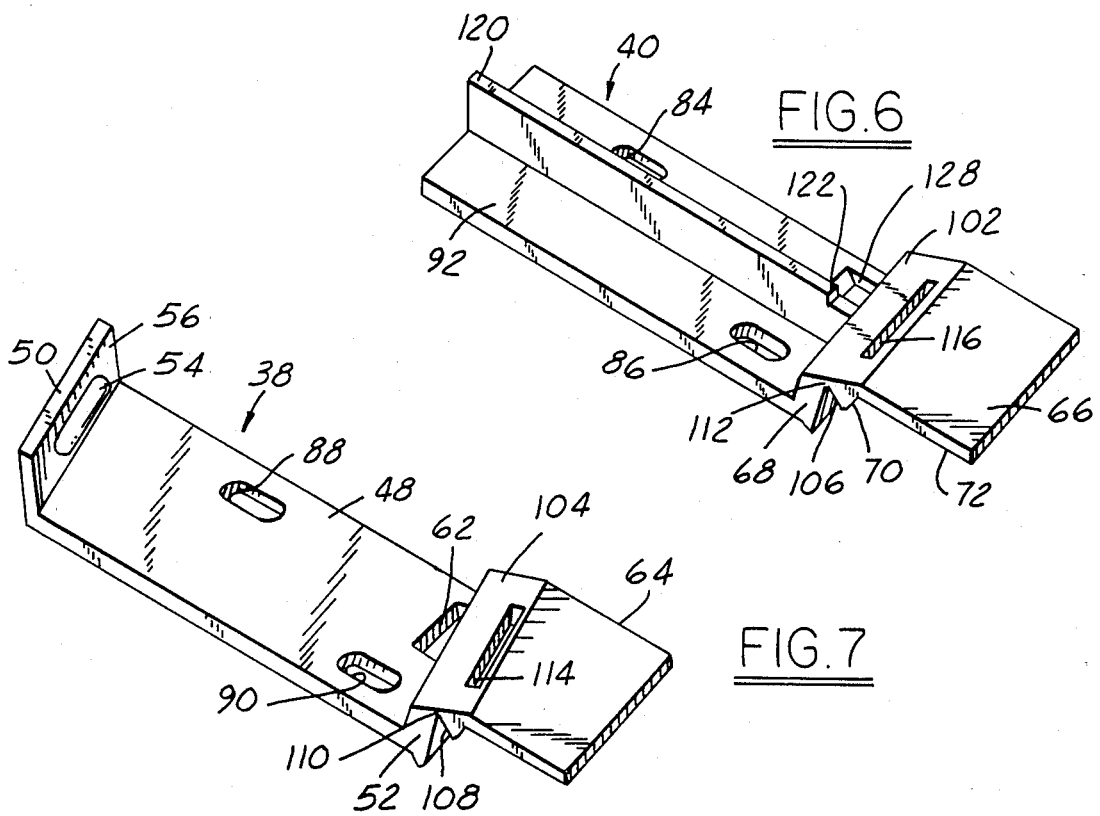

VEHICLE STRUCTURE INCLUDING A BRACKET STRUCTURE ASSEMBLY FOR MOUNTING A LOOSE UPPER DECK PANEL ONTO A VEHICLE BODY

CROSS-REFERENCE TO RELATED APPLICATIONS

This application is related to my co-pending applications Ser. No. 07/191,675, filed May 9, 1988 and Ser. No. 07/192,071, filed May 9, 1988.

BACKGROUND OF THE INVENTION

1. Field of the Invention

A bracket structure assembly is provided for mounting a loose upper deck panel onto a vehicle body. The bracket structure includes break-away spacer elements which are used for properly locating the bracket structure with respect to the vehicle deck lid.

2. Prior Art

The bracket structure assembly of the present invention is provided for mounting a loose upper deck panel onto a vehicle body. Conventionally, a loose upper deck panel is used as an exterior body panel on a sedan-like car or similar vehicle. This panel is positioned between the rear vehicle window and the forward edge of the deck or trunk lid. It is necessary that the upper surface of the loose upper deck panel be in alignment with the upper surface of the deck lid so that these two elements will present a continuous surface appearance. If the upper surface of the loose upper deck panel is higher or lower than the surface of the deck lid, an objectional discontinuous surface appearance results.

Conventionally, a loose upper deck panel is mounted on the vehicle after the deck lid has been mounted. Proper positioning of the loose upper deck panel has been achieved in the manufacturing process by means of full-sized fixtures. The fixtures are used to properly locate the panel on the vehicle body. Such fixtures are quite expensive. Additionally, the tolerance range and the accuracy of such fixtures is frequently not as close as desired. Further, such fixtures are bulky and heavy and difficult to handle. This latter point results in relatively inefficient use of the time of production workers.

In accordance with the present invention, a bracket structure is provided for mounting loose upper deck panels which does not require the use of a fixture for proper location of the panel. This substantially reduces manufacturing costs and tends to improve the quality of the finished vehicle.

Positionment of the brackets is accomplished by providing a break-away spacer element extending rearwardly from each bracket for contact with the forward edge and upper surface of the previously mounted deck lid. Once a bracket has been properly located, it is fastened in place. The break-away nature of the spacer element permits easy removal of this element after the bracket structure is secured in place. The loose upper deck panel is then secured on the bracket structure. This permits lower cost installation plus custom tailoring of each panel which takes into account variances in the tolerances of a vehicle build. All vehicles are not dimensionally identical. Thus, it is desirable to locate panels on the vehicle with reference to the exact physical characteristics of the vehicle which, as above stated, inherently vary from vehicle to vehicle.

A similar locating technique is disclosed in U.S. patent application Ser. No. 07/117,719, filed Oct. 6, 1987, now U.S. Pat. No. 4,786,094, issued Nov. 22, 1988. The presently disclosed structure differs therefrom in that both a vertical and horizontal positionment is achieved by means of two different locating surfaces and in that the bracket structure includes means for proper positionment of the panel after the bracket itself has been properly located.

SUMMARY OF THE INVENTION

Vehicle structure including a bracket structure assembly for mounting a loose upper deck panel onto a vehicle body is provided. The vehicle body includes a rear window and a deck lid spaced rearwardly therefrom. The loose upper deck panel is mounted between the rear window and the forward edge of the deck lid. The vehicle includes a support shelf positioned between the rear window and the forward edge of the deck lid. The loose upper deck panel is generally U-shaped and includes an upper wall extending transversely up the vehicle with forward and rearward walls extending downwardly therefrom. The loose upper deck panel is mounted on the vehicle with the upper surface of the upper wall thereof being in alignment with the upper surface of the deck lid.

The bracket structure assembly includes a first bracket. The first bracket is generally U-shaped and includes a bottom wall extending longitudinally on the support shelf of the vehicle with forward and rearward bracket walls extending upwardly therefrom. The forward bracket wall has a protuberance on the rearward surface thereof. The forward wall of the loose upper deck panel has opening means therein. The protuberance extends through the opening means to secure the forward wall in the desired vertical location. The rearward bracket wall has openings means therein. The rearward wall of the loose upper deck panel has mating opening means therein. Fastening means extend through the mating opening means to secure the rearward wall of the loose upper deck panel to the rearward bracket wall in the desired vertical location. At least one of the first brackets is mounted adjacent each transverse end of the loose upper deck panel.

The bracket structure includes a second bracket. The second bracket includes a bottom wall extending longitudinally on the support shelf of the vehicle. A rearward bracket wall extends upwardly from the last mentioned bottom wall. A central bracket wall extends upwardly from the last mentioned bottom wall longitudinally thereof. The central bracket wall functions to support the upper wall of the loose upper deck panel in the desired vertical location. The last mentioned rearward bracket wall has opening means therein. The rearward wall of the loose upper deck panel has mating opening means therein. Fastening means extend through the last mentioned mating opening means to secure the rearward wall of the loose upper deck panel to the last mentioned rearward bracket wall in the desired vertical location. At least one of the second brackets is mounted centrally of the loose upper deck panel.

A spacer element extends rearwardly from the upper end of each rearward bracket wall. The spacer elements each have a generally vertical location surface for contact with the forward edge of the deck lid to locate each bracket a predetermined distance forwardly of the forward edge of the deck lid. Each spacer element has a generally horizontal locator surface for contact with the upper surface of the deck lid to locate the brackets at a predetermined vertical orientation with respect to the upper surface of the deck lid. Shim structure is positioned between the bracket bottom walls and the support shelf to maintain the vertical orientation, as needed. Fastening means secure the bracket bottom walls to the support shelf. The spacer elements are joined to the rearward bracket walls by a frangible joint whereby the spacer elements may be easily broken away from the rearward bracket walls after the brackets have been located and fastened in place on the support shelf.

The frangible joint preferably comprises a portion of each bracket of reduced thickness formed at the apex of a V-shaped notch structure with each apex defining a break line.

Preferably, the protuberance on the forward bracket wall of the first bracket is elongated in the transverse direction and the opening means in the forward wall of the loose upper deck panel is elongated in a mating fashion. Preferably, elongated openings are provided in the bracket bottom walls of the first and second brackets to permit fore and aft adjustment of the brackets. Additionally, the central bracket wall of the second bracket is preferably provided with a notch in the upper rearward corner thereof to serve as a clearance space.

IN THE DRAWINGS

FIG. 4 is a sectional view similar to FIG. 3 illustrating the complete mounting of a loose upper deck panel on one form of bracket in accordance with the present invention;

FIG. 5 is a view similar to FIG. 4 illustrating mounting of the loose upper deck panel on a second type of bracket;

FIG. 6 is a view in perspective of the bracket used in the FIG. 4 showing; and

FIG. 7 is a view in perspective of the bracket used in the FIG. 5 showing.

DETAILED DESCRIPTION OF A PREFERRED EMBODIMENT

Figure 1:
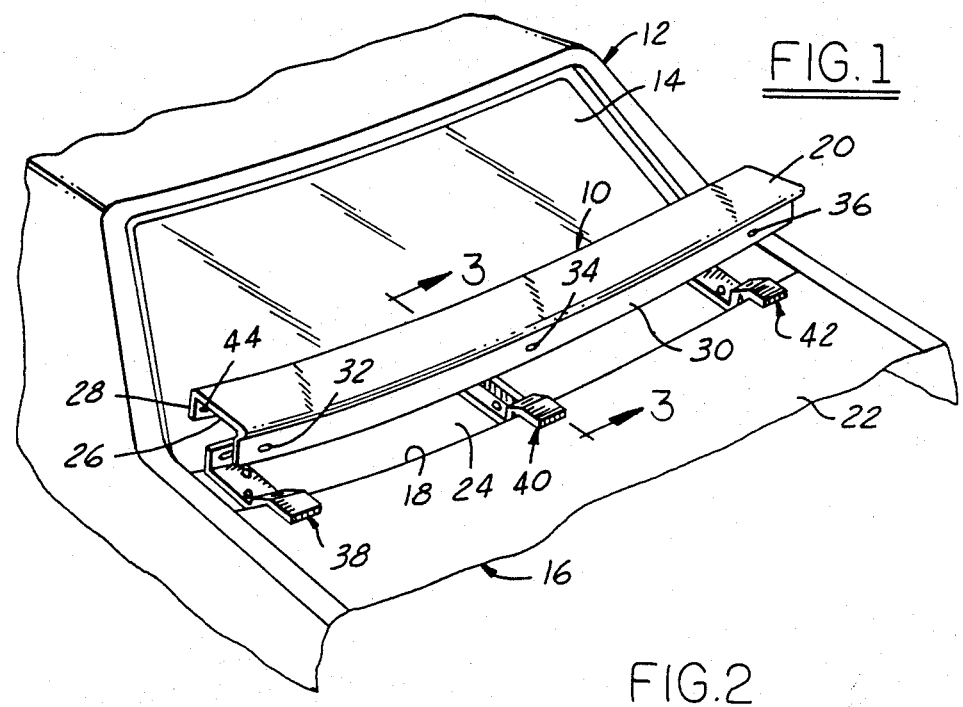
FIG. 1 is a perspective view of the rear portion of an automobile illustrating the bracket structure assembly for mounting a loose upper deck panel in accordance with one embodiment of the present invention.
Figure 2:
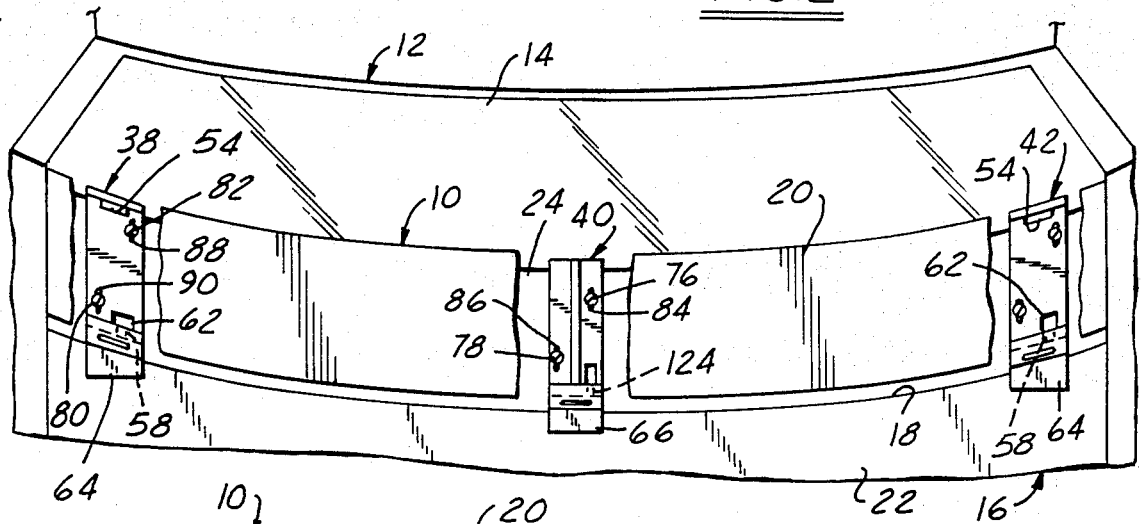
FIG. 2 is a top plan view of the structure of FIG. 1 with portions broken away for the purpose of clarity.

Referring to FIGS. 1 and 2, it will be noted that a loose upper deck panel 10 is positioned for mounting onto a vehicle 12, the vehicle being of the sedan type and including a rear window 14 and a deck or trunk lid 16. As is conventional, a space exists between the forward edge 18 of the deck lid 16 and the lower edge of the rear window 14. This space is conventionally filled, for exterior body purposes, by what is termed a loose upper deck panel, namely, the panel 10. The deck lid 16 is mounted onto the vehicle 12 prior to mounting of the panel 10 thereon. When the panel 10 is mounted, it is critical that the upper surface 20 of the panel 10 be in exact alignment with the upper surface 22 of the deck lid 16. If the panel 10 is too high or too low, an objectionable discontinuous body appearance results. The vehicle 12 includes a support shelf structure 24 which defines a portion of the inner body of the vehicle. The support shelf 24 extends in the space between the rear window 14 and the forward edge 18 of the deck lid 16.

Figure 3:
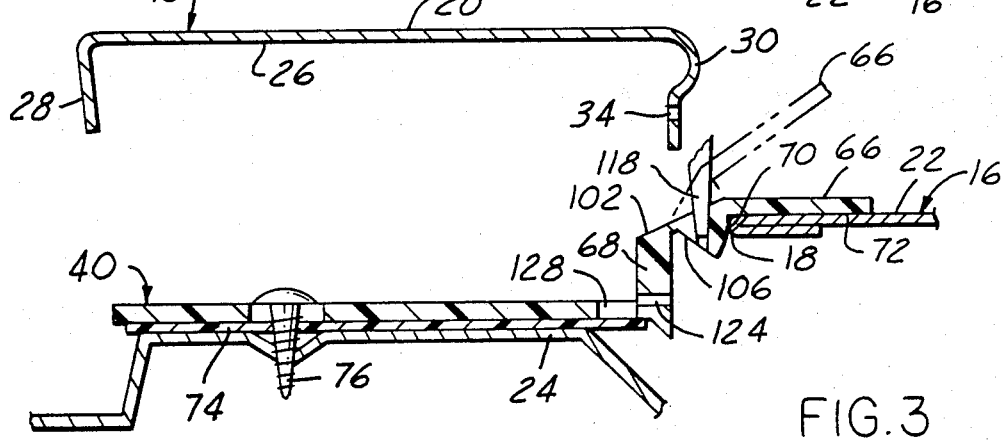
FIG. 3 is a sectional view taken substantially along the line 3—3 of FIG. 1 looking in the direction of the arrows.

The loose upper deck panel 10 is generally U-shaped as will be noted in FIGS. 1 and 3. The panel 10 includes an upper wall 26 which extends transversely of the vehicle 12. Forward and rearward walls 28, 30 extend downwardly from the forward and rearward edges of the upper wall 26. Spaced apart openings 32, 34, 36 are provided in the rearward wall 30. As will be later explained, these openings are for the purpose of mating with similar openings in brackets 38, 40, 42. A pair of elongated openings 44, 46 are provided in the forward wall 28 adjacent to the outer ends thereof to receive bracket protuberances as will be later described.

The brackets 38, 42 each have the same construction. These brackets, as will be noted in FIGS. 1, 2, 5 and 7, are generally U-shaped and include a bottom wall 48 which extends longitudinally of the support shelf 24 when the bracket is mounted in place. Forward and rearward bracket walls 50, 52 extend upwardly from the forward and rearward ends of the bottom wall 48. The forward bracket wall 50 has an elongated transverse protuberance 54 on the rearward surface 56. The protuberances 54 extend through the elongated openings 44, 46 provided in the forward wall 28 of the panel 10 when the panel 10 is mounted on the brackets. As will noted, the forward wall 28 of the panel 10 is received inside of the forward bracket wall 50 so that the protuberances may extend through the openings. This arrangement results in securing the forward wall 28 of the panel 10 in the desired vertical location, which location results in the upper surface 20 of the panel 10 being in alignment with the upper surface 22 of the deck lid 16.

The rearward wall 30 of the panel 10 is received on the outer surface of the rearward bracket wall 52 when the panel is set in place. At this point, the openings 32, 36 mate with the openings 58 provided in the rearward bracket wall 52. Sheet metal screws 60 are then screwed in place to result in fastening means securing the parts together. A cut out portion 62 is provided in the bracket bottom wall 48 adjacent to the opening 58 to receive the inner end of the sheet metal screw. Again, the mating nature of the openings in the panel 10 and brackets results in securing the rearward wall 30 of the panel 10 in the desired vertical location so that the upper surface 20 of the panel 10 will be in alignment with the upper surface 22 of the deck lid 16.

Prior to mounting of the panel 10 onto the brackets, the brackets are fastened to the support 24. The brackets are first positioned in the desired longitudinal and vertical position to result in the desired alignment of the surfaces 20, 22 as previously discussed. This positionment is accomplished by means of a spacer element 64 provided on the brackets 38, 42 and a spacer element 66 provided on the bracket 40. The construction of the spacer elements is substantially similar on both types of brackets. As will be particularly noted in FIG. 3, the spacer element 66 is provided in the form of a tab which extends rearwardly from the upper end of the rearward bracket wall 68. The spacer element has a generally vertical locator surface 70 for contact with the forward edge 18 of the deck lid 16 to locate the bracket a predetermined distance forwardly of the forward edge 18. The bracket is first set on the support shelf 24 and moved manually until the surface 70 contacts the forward edge 18. The spacer element 66 also has a generally horizontal locator surface 72 for contact with the upper surface 22 of the deck lid 16 to locate the bracket at a predetermined vertical orientation with respect to the upper surface of the deck lid. In many cases, it is necessary to provide a shim 74 beneath the bracket to raise the bracket to the desired elevation. Shims 74 are used as needed.

After the bracket has been properly located, it is secured in place by means of screws 76, 78 and 80, 82 which are received in elongated pairs of openings 84, 86 and 88, 90 of the bracket bottom walls 48, 92. The openings are elongated to permit the necessary fore and aft adjustment of the brackets for positioning the brackets in the proper longitudinal position with respect to the forward edge 18 of the deck lid 16 as previously described. Suitable opening structures 94, 96 and 98, 100 are provided in the support shelf structure 24 to receive the screws. The screws may be driven directly through the shim structures.

After the brackets have been properly located and secured in place, the spacer elements 64, 66 are removed. The brackets are preferably fabricated of a plastic material which is frangible, that is, will easily break. Each spacer element is joined to the bracket body by means of a frangible joint 102, 104. To obtain a frangible joint in the present invention, a portion of the bracket is of reduced thickness. This is obtained by means of providing V-shaped notches 106, 108 with the apexes defining break lines 110, 112. When the brackets are secured in place, the spacer elements are broken away and discarded. As will be noted, slots 114, 116 are provided in the spacer elements. The spacer element is bent outwardly as shown in dotted lines in FIG. 3 as by means of a screwdriver tip 118 until the joint fractures. After removal of the spacer elements, the loose upper deck panel is mounted as previously described.

The bracket 40 differs from the brackets 38, 42 in that a forward bracket wall is not provided and a central bracket wall 120 extends upwardly from the bottom wall 92 longitudinally thereof. The central bracket wall 120 functions to support the upper wall 26 of the panel 10, maintaining this wall at the proper vertical elevation. Because of the length of the panel 10, there may be a tendency for the center portion thereof to sag. As will be noted, one of the brackets 38, 42 is provided at each end of the panel 10 while the bracket 40 is provided as substantially the center thereof. A notch 122 is provided in the upper rearward corner of the wall 120. The notch 122 serves as a clearance space. An opening 124 is provided in the bracket rear wall 68 and receives screw 126 which extends through opening 34 of the panel rearward wall 30 to secure these parts together. Again, a cutout 128 is provided to receive the inner end of the screw 126. Again, the mating nature of the openings 124, 96 assures a proper positionment of the panel 10 with respect to the deck lid 16.

I claim:

1. Vehicle structure including a bracket structure assembly for mounting a loose upper deck panel onto a vehicle body, the vehicle body including a rear window and a deck lid spaced rearwardly therefrom, the loose upper deck panel being mounted between the rear window and the forward edge of the deck lid, the vehicle including a support shelf positioned between the rear window and the forward edge of the deck lid, the loose upper deck panel being generally U-shaped and including an upper wall extending transversely of the vehicle with forward and rearward walls extending downwardly therefrom, the loose upper deck panel being mounted on the vehicle with the upper surface of the upper wall thereof being in alignment with the upper surface of the deck lid, the bracket structure including at least two first brackets, each first bracket being generally U-shaped and including a bottom wall extending longitudinally on said support shelf of the vehicle with forward and rearward bracket walls extending upwardly therefrom, the forward bracket wall having a protuberance on the rearward surface thereof, the forward wall of the loose upper deck panel having opening means therein, said protuberance extending through said opening means to secure said forward wall in the desired vertical location, the rearward bracket wall having opening means therein, the rearward wall of the loose upper deck panel having opening means therein mating with the lastmentioned opening means, fastening means extending through said mating opening means to secure the rearward wall of the loose upper deck panel to the rearward bracket wall in the desired vertical location, at least one of said first brackets being mounted adjacent each transverse end of the loose upper deck panel, the bracket structure including a second bracket, the second bracket including a bottom wall extending longitudinally on said support shelf of the vehicle, a rearward bracket wall extending upwardly from said lastmentioned bottom wall, a central bracket wall extending upwardly from said lastmentioned bottom wall, a spacer element extending rearwardly from the upper end of each rearward bracket wall, the spacer elements each having a generally vertical location surface for contact with the forward edge of the deck lid to locate each bracket a predetermined distance forwardly of the forward edge of the deck lid, each spacer element having a generally horizontal locator surface for contact with the upper surface of the deck lid to locate the brackets at a predetermined vertical orientation with respect to the upper surface of the deck lid, shim structure for positionment between the bracket bottom walls and the support shelf to maintain said vertical orientation, and fastening means securing the bracket bottom walls to the support shelf, the spacer elements being joined to the rearward bracket walls by a frangible joint whereby the spacer elements may be easily broken away from the rearward bracket walls after the brackets have been located and fastened in place on the support shelf.

2. Vehicle structure as defined in claim 1, further characterized in that the frangible joint of said first and second brackets comprises a portion of each bracket of reduced thickness.

3. Vehicle structure as defined in claim 2, further characterized in that said reduced thickness of said first and second brackets is formed at the apex of a V-shaped notch structure, each apex defining a break line.

4. Vehicle structure as defined in claim 1, further characterized in that the protuberance on the forward bracket wall of said first bracket is elongated in the transverse direction with respect to the vehicle body and the opening means in the forward wall of the loose upper deck panel is elongated in a mating fashion.

5. Vehicle structure as defined in claim 1, further characterized in that elongated openings are provided in the bracket bottom walls through which the lastmentioned fastening means extend, said elongated openings permitting fore and aft adjustment of the brackets.

6. Vechicle structure as defined in claim 1, further characterized in that the central bracket wall of the second bracket is provided with a notch in the upper rearward corner thereof to serve as a clearance space.

* * * * *